United States Patent
Boland et al.

(10) Patent No.: US 9,449,103 B2
(45) Date of Patent: Sep. 20, 2016

(54) SYSTEMS AND METHODS FOR PRESENTING ELECTRONIC CONTACT LISTS

(75) Inventors: Kieran Gerard Anthony Boland, Newry (IE); Telemaque Ndizihiwe, Dublin (IE); Mark Ernest Wallace, Dublin (IE); Michael Cronin, Milltown (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 587 days.

(21) Appl. No.: 13/038,416

(22) Filed: Mar. 2, 2011

(65) Prior Publication Data
US 2012/0226704 A1 Sep. 6, 2012

(51) Int. Cl.
*G06F 17/30* (2006.01)

(52) U.S. Cl.
CPC .............................. *G06F 17/30867* (2013.01)

(58) Field of Classification Search
CPC combination set(s) only.
See application file for complete search history.

(56) References Cited

U.S. PATENT DOCUMENTS

| | | | |
|---|---|---|---|
| 7,797,293 B2 | 9/2010 | Pabla et al. | |
| 8,156,098 B1* | 4/2012 | Landsman | G06Q 30/00 707/706 |
| 8,577,895 B2* | 11/2013 | Gupta | H04M 1/274583 707/748 |
| 8,726,165 B1* | 5/2014 | Phillips | G06F 3/0237 715/739 |
| 2005/0289180 A1* | 12/2005 | Pabla | G06Q 10/109 |
| 2006/0136584 A1 | 6/2006 | Decker et al. | |
| 2006/0209690 A1* | 9/2006 | Brooke | G06Q 10/109 370/230 |
| 2008/0147639 A1 | 6/2008 | Hartman et al. | |
| 2009/0037822 A1 | 2/2009 | Kandekar et al. | |
| 2009/0228555 A1 | 9/2009 | Joviak et al. | |
| 2010/0042600 A1 | 2/2010 | Orr et al. | |
| 2010/0080368 A1 | 4/2010 | Erhart et al. | |
| 2010/0082693 A1 | 4/2010 | Hugg et al. | |
| 2010/0093323 A1 | 4/2010 | Kimbrell et al. | |
| 2011/0231396 A1* | 9/2011 | Dhara | H04L 12/1818 707/731 |
| 2012/0095979 A1* | 4/2012 | Aftab | G06F 17/30867 707/706 |

* cited by examiner

*Primary Examiner* — Shyue Jiunn Hwa
(74) *Attorney, Agent, or Firm* — Schmeiser, Olsen & Watts LLP (57) ABSTRACT

Described are a conference management system and method for displaying a contact list of an application on a computing system. A contact list of an application is provided. Context information related to a user of the contact list is detected. At least one rule is applied to the context information. User contacts in the contact list arranged in a display order in response to the at least one rule.

20 Claims, 4 Drawing Sheets

SYSTEMS AND METHODS FOR PRESENTING ELECTRONIC CONTACT LISTS

FIELD OF THE INVENTION

The present invention relates generally to electronic communications applications, and more specifically, to systems and methods for presenting an arrangement of relevant contacts to an electronic device user.

BACKGROUND

Modern computer users can communicate with each other in a variety of different ways. Popular electronic communication methods rely on computer application programs to permit users to communicate with each other. Examples of electronic communications application programs, also referred to as applications, include electronic mail (email) and instant messaging and presence (IM&P), for example, the IBM® Sametime® unified communications and collaboration application. Other examples include applications related to text messaging, voice over IP (internet protocol), video conferencing, online games, mobile messaging, and the like.

An electronic communication application often includes a user-defined contact list to simplify use of the application. A contact list can include email addresses, phone numbers, instant messaging addresses, and other contact information, which is created and maintained by the user. For example, an IM&P application can include a specific contact list, referred to as a "Buddy List," that includes a listing of other users of the same IM&P application,

BRIEF SUMMARY

An embodiment features a computer-implemented method of displaying a contact list of an application on a computing system. A contact list of an application is provided. Context information related to a user of the contact list is detected. At least one rule is applied to the context information. User contacts in the contact list arranged in a display order in response to the at least one rule.

Another embodiment features a computer-implemented method for displaying a contact list. A contact list is refreshed to arrange contacts according to a first display order. A rule is applied to the contact list to determine an arrangement of contacts in the contact list according to relevance to the user. The contact list is queried for changes to the contact list. The rule is executed. Context information is determined to be related to a user of the contact list. The contact list is rendered. The contacts in the contact list have a second display order in response to the context information and the rule.

Another embodiment features a computer program product for displaying a contact list, the computer program product. A computer readable storage medium has computer readable program code embodied therewith. Computer readable program code is configured to provide a contact list of an application. Computer readable program code is configured to detect context information related to a user of the contact list. Computer readable program code is configured to apply at least one rule to the context information. Computer readable program code is configured to arrange user contacts in the contact list in a display order according to the context information and the at least one rule.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

In brief overview, the systems and methods described in accordance with embodiments present a list of contacts to a computer user, which are arranged so that contacts that are relevant or important to the user are positioned at a more prominent location in the contact list, for example, at or near the top of the list, than less relevant contacts.

A conventional contact list having a large number of contacts can be difficult to organize. Moreover, contact lists can often be impractical for providing relevant contact status information to the user, since the contacts are typically displayed to the user in a random order, or in alphabetical order or chronological order, i.e., the order in which the contacts were created. Accordingly, contacts proximal to the top of the list may often be of no interest to the user, while relevant contacts may be positioned at the bottom of the contact list. In addition, where multiple communications application programs are used, it is difficult for the user to update a contact list for each application.

Some instant messaging applications can filter certain contacts on a contact list by presenting only contacts that are online or "present" to the user. Other applications include filtered viewing features, for example, to view certain folders or contract entries in the folders. Embedded contact lists are also available, which display a list of contacts corresponding to a particular context of the user, for example, members of a forum who are on-line. However, the presented list often does not reflect the entire list of relevant contacts to the user, since the relevant contacts may be divided among two different forums. For example, the relevant users of the two forums may be collaborating on a document at the same time, but the user may only have one contact list, thereby capable of communicating with only one forum of relevant users. Another conventional approach includes providing fixed or static user context inputs to applications pertinent to the user such as email or an IM&P application. However, this rigid approach provides limited effectiveness because it relies on static data applied to the contact list.

The systems and methods according to an embodiment offer a different approach. In particular, the contacts in a contact list are arranged according to user criteria, specifically, according to at least one user-defined rule or criteria applied to electronic information corresponding to a detected context or state of the user. The arranged contact list is displayed on a user interface corresponding to an application in communication with the contact list, for example, an IM&P client, in response to the rule or rules created by the user as applied to the detected user context. The arrangement of contacts in the contact list can be adjusted automatically when one or more contexts change, when a rule changes, and/or when changes are made to the contact list. Thus, the dynamic adjustments made to the contact list permit the user to always see the most relevant contacts in the displayed contact list, even if different rules are applied or if the user's contexts change. For example, one set of contacts can be displayed during work hours that includes professional acquaintances, and another set of contacts can be displayed during nights and weekends that includes friends and family.

A contact list can be displayed on a user interface, for example, a IM&P client, according to an initial arrangement of contacts, for example, in alphabetical order. The systems and methods in accordance with an embodiment can determine one or more user contexts, for example, the user's work schedule or travel plans, keywords from the user's profile, status of applications running on the user's computer, relationships with other users, and the like. The user can define a rule that the contact list displays only contacts having professional relationships with the user during work hours, and that the contact list displays only contacts having a social relationship with the user, for example, friends and family, during non-working hours. When these rules are applied and a context is determined, for example, the time of day is determined to be during working hours, the contacts determined to be professional relationships are positioned at the top of the contact list. For example, the systems and methods can establish from context information that the user is a professional musician. Information related to the contacts can also establish which contacts are also professional musicians, wherein these contacts can be positioned at or near the top of the contact list in accordance with the user-defined rule.

When the context changes, for example, when work hours are over, or if a different rule is applied, the contact list can be refreshed, and a different arrangement of contacts displayed to the user, for example, the contacts determined to be social relationships are positioned at the top of the contact list. Accordingly, the contact list can be dynamically updated according the user requirements.

Figure 1:
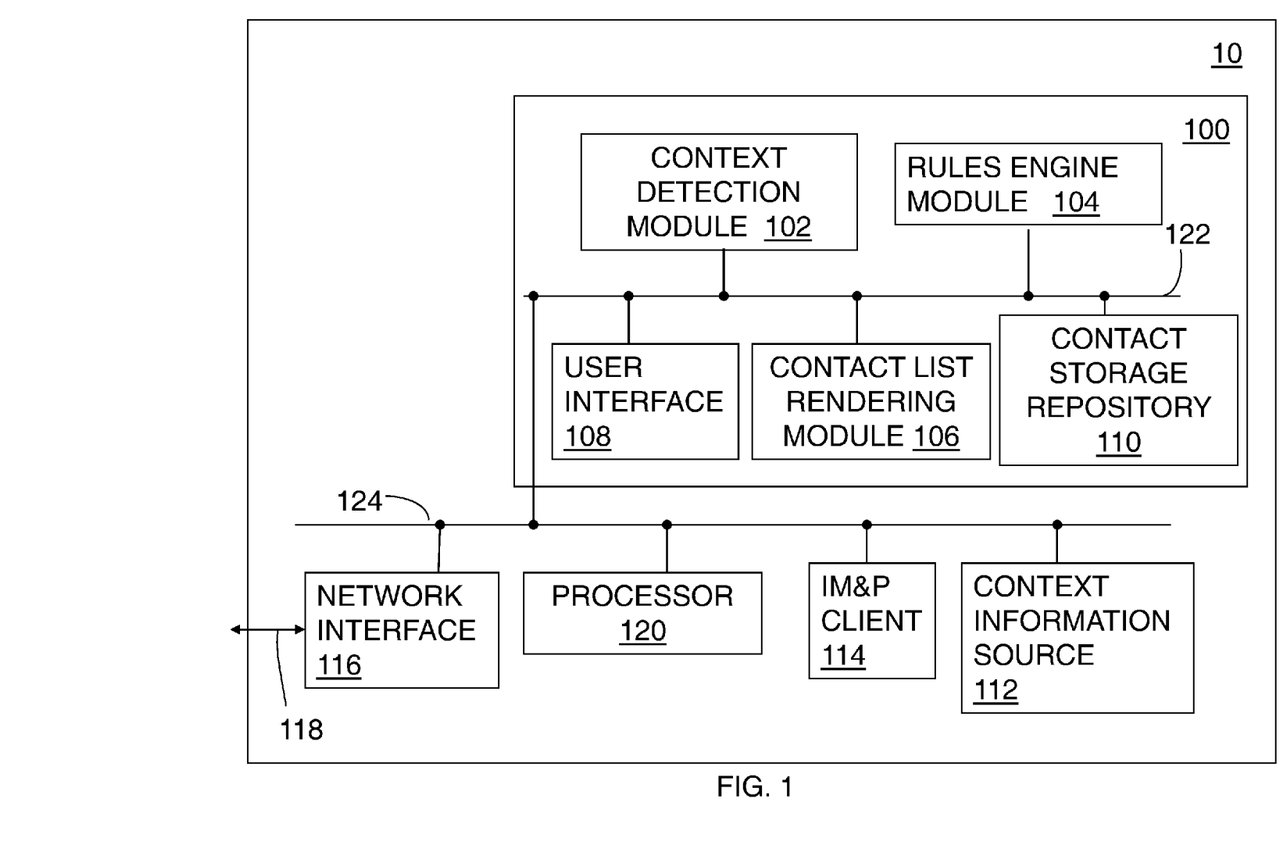
FIG. 1 is a block diagram of an embodiment of a computing system for dynamically arranging a contact list.

FIG. 1 is a block diagram of an embodiment of a computing system 10 for dynamically arranging a contact list.

The computing system 10 includes a processor 120, a contact list modification system 100, and a network interface 116 each coupled to an interconnect 124, and in communication with each other via the interconnect 124. The computing system 10 can optionally include at least one context information source 112 and an IM&P client 114. In other embodiments, the at least one context information source 112 and an IM&P client 114 are physically separate from the computing system 10 and in communication with the computing system via the network interface 116. The interconnect 124 can include one or more communication buses or connectors known to those of ordinary skill in the art. The interconnect 124 can connect the processor 120 to other components of the computing system 10 not shown for purposes of brevity, for example, user-input devices such as a keyboard, displays, peripherals, additional memory, for example, read-only memory (ROM), random access memory (RAM), and the like.

The contact storage repository 110 can be part of the contact list modification system 100 as shown in FIG. 1, or can be physically or logically separate from but in communication with the contact list modification system 100. The contact storage repository 110 can include movable or non-removable storage media, examples of which include, but are not limited to, hard disks, USB memory sticks, optical disks such as CD ROMs, magnetic diskettes, and flash memory cards.

The computing system 10 can include application programs such as the IM&P client 114, for example, the IBM® Sametime® application program, or other application programs including, but not limited to, email, voice over IP, video conferencing, online games, mobile messaging, internet browsers, electronic document processing applications, and the like. Example implementations of the computing system 10 include, but are not limited to, a personal computer (PC), Macintosh® computer, a workstation, a kiosk, laptop computer, tablet computer, hand-held electronic device, such as a personal digital assistant (PDA), a mobile or cellular phone, a network terminal, and other electronic devices having a display, or in communication with a display, for presenting contacts in text and/or graphical images to a user.

The network interface 116 of the computing system 10 includes a connector 118 that can connect to a network capable of transmitting data or other media types such as a local area network (LANs), a wide area network (WANs), the Internet, a Wi-Fi network, or other any other network or combination of wireless and wired networks known to those of ordinary skill in the art.

The contact list modification system 100 includes a context detection module 102, a user-configurable rules engine module 104, a contact list rendering module 106, and a user interface 108, each of which can be in hardware, software, or a combination thereof, and each communicating with other elements of the computing system 10 herein via a communications bus 122. The communications bus 122 can be known to those of ordinary skill in the art, for example, a Peripheral Component Interconnect (PCI) bus, an Industry Standard Architecture (ISA) bus, and the like. The communications bus 122 can be part of the interconnect 124.

The context detection module 102 can detect context information related to a user by communicating with the context information source 112 and/or external context information sources. The detected context information can be provided to the contact list rendering module 106 and/or the rules engine module 104 for generating a contact list in accordance with embodiments of the systems and methods described herein.

The context information source 112 can include one or more application programs, processes, or tasks executed on the computing system 10, for example, executed by the processor 120 or other programmable data processing apparatus. The context information source 112 can be part of an application program, for example, email, calendar, internet telephony or video, for example, Skype™, instant messaging, for example, IM&P client 114, word processing applications, spreadsheets, media readers or generators, for example, Adobe Acrobat® or other application programs known to those of ordinary skill in the art as providing context information. Context information can be determined from any field or parameter in the abovementioned context information sources, for example, as determined by the user.

Other context information sources can be external to the computing system 10, for example, a social network service such as Facebook™, or a directory server or database containing context-related content, for example, a Lightweight Directory Access Protocol (LDAP) directory.

Context information can pertain to the user's physical or social environment, or current or historical state. Context information can also pertain to people or objects in the user's environment. Examples of context information can include, but are not limited to, event information such as the time, date, and/or occurrence of specific events, contact information, for example, a current or future location of contact, geographic location changes, general work task information, expertise, personal preferences or interests, and the like. Other examples relate to group dynamic information, or other social interaction information, for example, a degree of relationship between the contact and the user, which can be determined from contents of an IM session or email message, or from a query of a social network service or other information repository.

The context information can be provided as contextual inputs in the form of keywords, metadata, electronic signals, and the like, from the context information source 112. For example, a signal can be provided that an application program such as a spreadsheet or calendar is active or in use by the user, or is inactive or closed. In another example, context information can be provided pertaining to an application program such as time, subject, and description fields of a meeting or events calendar. In another example, a GPS detector on the user's smartphone can provide information of geographic location changes. Other event-related context information can be provided indicating whether an application, process, or task is executed on the computing system 10, or is inactive or in use.

The context detection module 102 can detect new events or changes in events in real-time or according to a predetermined schedule, for example, at predetermined intervals. The context detection module 102 can likewise provide context information to the contact list rendering module 106 and/or the rules engine module 104 in real-time, or according to a predetermined schedule. Optionally, the context detection module 102 can provide context information to the contact list rendering module 106 and/or the rules engine module 104 in response to an event, or when new context information or a change in context information is detected. For example, a calendar application can have a time-of-day field that communicates with a system clock of the computing system 10. The context detection module 102 can monitor the time-of-day field to determine scheduled calendar events. In another example, the context detection module 102 can detect context information from key words in a subject field of an email application. For example, the context detection module 102 can detect from a subject field of an email message that the user is to be added to a new project.

The context detection module 102 can determine one or more currently active applications, for example, determine whether a computer-based or online calendar is executed or running on the user computer, determine from the calendar events pertaining to the user's schedule, timeframes, contacts participating in those events, and other context-related information. Accordingly, the context detection module 102 can monitor an application program for the occurrence of an event associated with the application program, for example, meetings scheduled by the user in a calendar. An executed rule provided by the user can trigger additional queries for context information used to modify a contact list to display contacts relevant to the user in view of the rule and the context information.

The context detection module 102 can also detect changes to one or more different contact lists, for example, contact lists corresponding to different application programs. For example, the context detection module 102 can detect a change in job title, home address, personal interests, and the like of a contact in the contact list.

A rules engine module 104 is configured to apply one or more rules that determine an action to be applied to the contact list display based on the determined contexts. In particular, the rules engine module 104 permits a user to establish the criteria under which contacts in the contact list are to be arranged according to user requirements. More specifically, the user can create one or more rules by providing the rules to the rules engine module 104. This can be achieved by inputting the rules from the user interface 108 or the IM&P client 114, or by importing the rules from a remote source, for example, another application. The rules can be provided to the contact list rendering module 106, which dynamically determines the arrangement of contacts of the contact list in the contact storage repository 110 or other contact lists corresponding to other applications on the computing system 10, for example, an instant messaging contact list, which may be located separately from the contact storage repository. The IM&P client 114 can have one or more contact lists. For example, an administrator can create several groups, for example, public and/or private groups, on an Instant Messaging Server such as the IBM® Sametime® Community Server, not shown, wherein a user can import contents from one or more of the groups stored on the server.

The contact list rendering module 106 arranges the contacts in the contact list according to the context information provided by the context detection module 102 and the user-defined rules provided by the rules engine module. The contact list rendering module 106 can also process contact information corresponding to the contacts, which can be determined from contact fields corresponding to the contacts, or by querying an external source, for example, an LDAP directory, a human resource system, or a social network service, for example, the Facebook® social network. In an embodiment, each contact in the contact list can be assigned a weight based on the rules and the determined contexts. The contacts can be ranked, or displayed in the contact list, according to weight. For example, a higher weight can be indicative of a higher relevance of the contact to the user based on the established rules. In other embodiments, the contacts are arranged according to a filtering device corresponding to an application program, for example, IM&P client 114 that filters or sorts the contacts of a widget of the IM&P client 114.

The contact list rendering module 106 generates an updated contact list with the required or most relevant contacts at the top based on the user-defined rules provided by the rules engine module 104. The contact list rendering module 106 can additionally receive context information and/or contact information to dynamically determine which contacts in a contact list are displayed. The contact list rendering module 106 can also reduce the number of contacts in a contact list in accordance with one or more rules.

The user interface 108 permits a single contact list to be displayed that includes the adjusted contacts, even if multiple contact lists are available for different applications. For example, multiple contact lists can be consolidated into a single contact list on the user interface 108, wherein the list includes contacts arranged according the rules established by the user.

As described above, the contact storage repository 110 can include a contact list, arranged by the contact list rendering module 106. A user can add new contacts to the contact list or remove contacts from the contact list using a keypad or other input device of the computing system 10 applied to the user interface 108. When contacts are added, the user can add descriptive details regarding the contact, for example, job title, interests, and the like. These descriptive details can be provided to the contact list rendering module 106, and applied by the rules to determine a relevance ranking of the contact. The user can also add descriptive details to contacts located separate from the contact storage repository 110, for example, an LDAP directory, or other contact list repository corresponding to an email application, IM&P application, and the like. The contact storage repository 110 can comprise a shared or dynamic library allowing application programs or processes to request or retrieve a contact list, which can be updated in accordance with the rules and contexts received by the contact list rendering module 106.

The IM&P client 114 can include a graphical user interface (GUI) library to provide a graphical representation of the clients produced by the contact list rendering module 106. The IM&P client 114 can include one or more list, tree, table, or text widgets to add or modify contacts, and display the contacts as hierarchically-organized data. For example, the tree widgets can display contact names with an associated icon or font or other status indicator based on the contacts' presence. The contact list rendering module 106 can communicate with the widgets to determine which contacts should be displayed and in what order, in accordance with the user-defined rules.

During operation, a client list can be presented to the contact list rendering module 106. The clients are organized according to a listing or arrangement, for example, alphabetical order. This listing can be updated, for example, by adding a new contact and corresponding information fields from the IM&P client 114 or via the user interface 108.

The contact list rendering module 106 can change the listing to have a different arrangement of contacts based on a set of predefined rules, and further dependent on the user contexts to which the rules are applied. The contact list rendering module 106 produces a new listing of contacts arranged according to the rules and outputs the list to the IM&P client 114, the user interface 108, a web browser, or other application capable of displaying contact lists.

Figure 2:
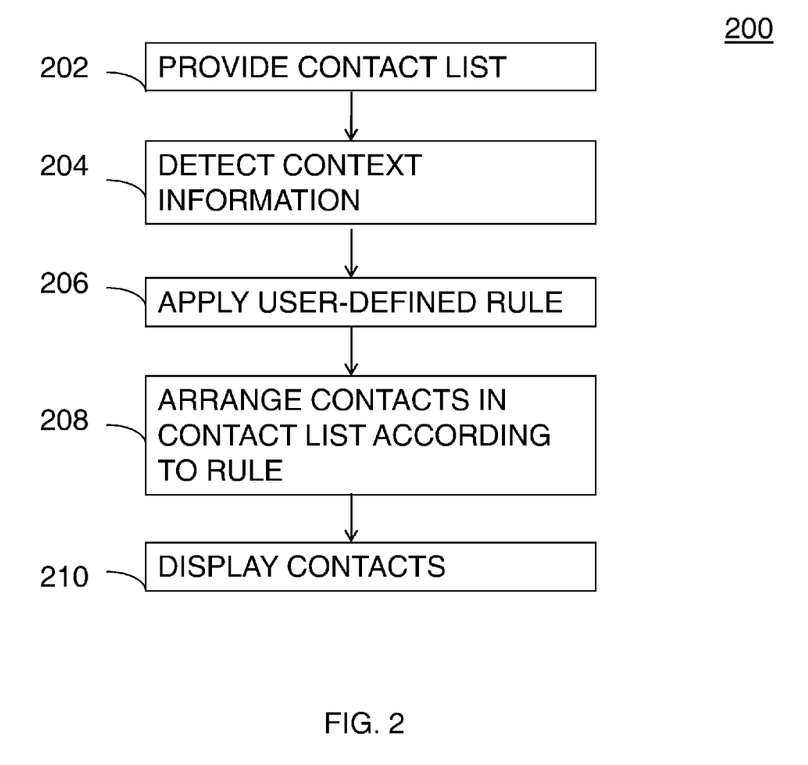
FIG. 2 is a flow diagram of an embodiment of a method for displaying a contact list.

FIG. 2 is a flow diagram of an embodiment of a method 200 for displaying a contact list. Some or all of the method 200 can be performed in the contact list modification system 100 described with reference to FIG. 1, or alternatively, in a messaging client, such as an IM&P client/application, or other application in communication with a contact list. The various steps described in the method of FIG. 2 can be performed when an application such as a calendar or email application is executed, or other event described herein occurs.

Accordingly, the method 200 can begin at step 202, where a contact list is provided. The contact list can be provided from a central data repository, for example, from the contact storage repository 110 shown in FIG. 1, or from one or more contact list repositories each corresponding to a different application program, for example, an email application and an IM&P application.

A user can add new contacts to the contact list, or remove contacts from the contact list using a keypad or other input device of the computing system 10. The contact list can also be updated by another application on the computing system 10 by updating the contact list with contacts from other applications on the computing system 10. For example, the contact list can include an email address list of an email application by synchronizing the contact list in the contact storage repository 110 with an email application, using synchronization tools that are known to those of ordinary skill in the art. The contact list can be updated with contacts provided from sources external to the computing system 100, for example, a database. When adding a contact to the contact list, the user can also enter information corresponding to the contact, for example, an address, job title, personal interests, and the like. The user can also specify whether a contact can be provided under certain contexts. In this manner, the user can "prime" or embellish a contact in the contact list with user-defined fields that can be used to draw a relationship or other association between the user and the contact. This information is provided as electronic data to the computing system 100, which processes the electronic data for possible use in determining contact relevance rankings.

Context information is detected 204. In an embodiment, the context information pertains to the user. The context information can be determined by querying one or more context information sources 112 described above. The context information can include but not be limited to event information such as time, date, and/or occurrence of specific events, for example, the working hours of the user or a contact on the contact list, and the like. Context information can also include but not be limited to an application state, contact information, including current or future location of contact, degree of relationship between the contact and the user, mutual interests, geographic location changes, general work tasks, expertise, and/or changes to the abovementioned events.

At least one rule is applied 206. In an embodiment, a rule is created by the user, and applied to the determined context information. The rules are applied to the contact list to determine the arrangement of contacts of the contact list. Multiple rules can be applied for the same context, for example, shown in FIG. 4. When the rule is applied, a search query can be performed of one or more context information sources for additional contexts applicable to the rule.

An example of a user-defined rule is that a list of musical contacts is to be displayed from 3:00 p.m. to 3:30 p.m. If a contact in the contact list includes information indicating that the contact is a musical contact, for example, having a musical connection to the user, this information can be used to add the contact to the contact list in accordance with the rule.

Contact information can be received and applied according to the rule to determine the position or ranking of the contact in the contact list. For example, if the contact information indicates that the contact is an experienced software engineer, and a rule is defined to display a list of contacts who are experienced software engineers, then the contact will be displayed at a higher position in the contact list than a non-software engineer.

The contacts in the contact list are arranged 208 according to the at least one rule. Different rules can be applied at different times, or multiple rules can be applied at the same time. The contacts can also be arranged according to an application feature. For example, the IM&P client 114 can determine whether a contact is presently active on the network, i.e., on-line, or in other state, for example, not on the network. Regardless of whether the contact is relevant to the user, the contact can be removed from the contact listing for reasons determined by the user. Alternatively, the IM&P 114 can assign a status indicator to the contacts, wherein each contact is identified as being active or inactive.

The contacts are displayed 210 according to the determined arrangement. In the event that a rule change, a context change, or a contact change occurs, the display of contacts can be rearranged in response to the change as described herein.

Figure 3:
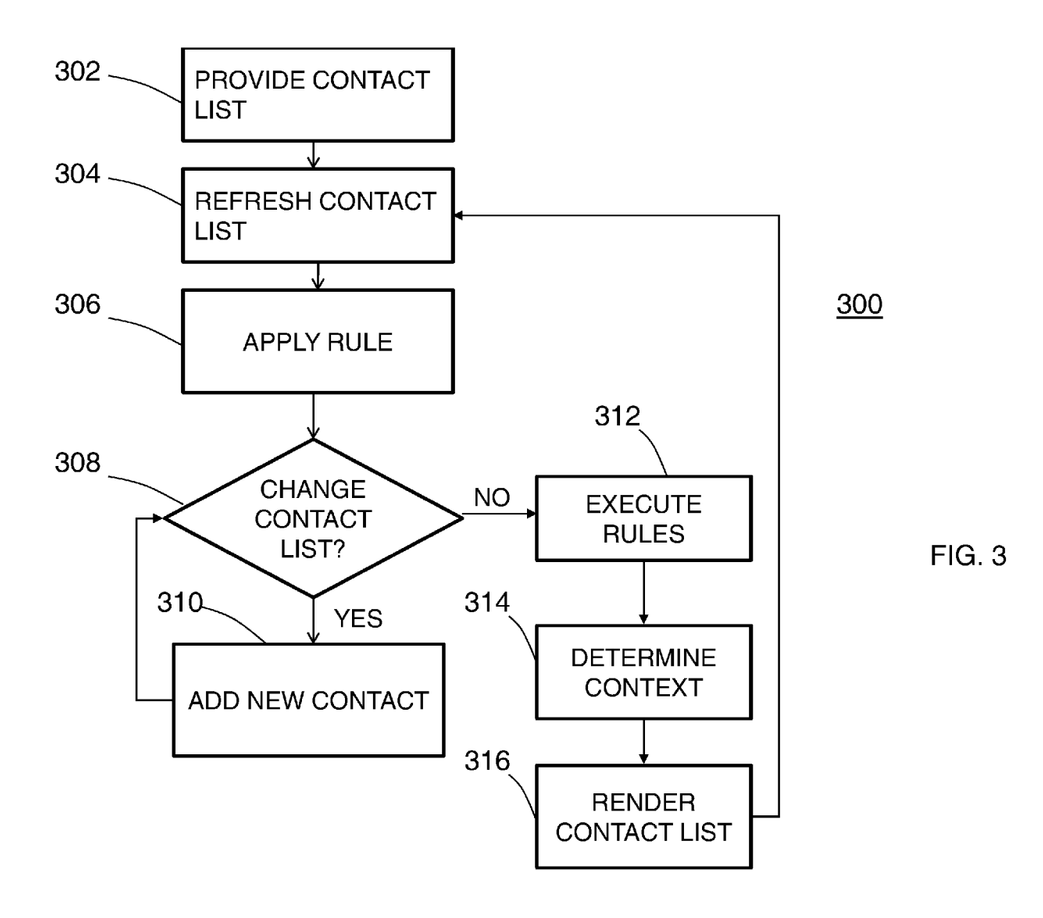
FIG. 3 is a flow diagram of an embodiment of another method for displaying a contact list.

FIG. 3 is a flow diagram of an embodiment of a method 300 for displaying contacts on a contact list. Some or all of the method 300 can be performed on the computing system 100 described with reference to FIG. 1.

The method 300 can begin with a contact list being provided 302 for adjustment according to user-defined criteria. The contact list can be provided in a similar manner as that described in FIGS. 1 and 2, for example, from a central data repository or from multiple contact lists corresponding to different computer applications, for example, email, IM&P, contact organizer, and the like. The contact list can be configured by a user to add, remove, or modify contact information in the contact list. The contact list can include contacts corresponding to a detected user context. For example, a set of contacts in an e-mail application executed on the computing system 10 can be included in the contact list.

The contact list can be refreshed 304 when one or more new user-defined rules are provided, when contacts are added, removed, or modified, or when a new context is determined. When the contact list is refreshed, the contact list is no longer dependent on rules, but is instead arranged according to program instructions in the application displaying the contact list, for example, an IM&P application configured to display the contact list according to alphabetical order. In other words, the contacts in the contact list may be rearranged so that the contact list is returned to an original state, for example, unaffected by rules, contexts, etc. For example, if a contact list is arranged according to a rule that ends at 3 p.m., and it is determined from a context that the current time is 3:01 p.m., the contact list can be refreshed.

In an embodiment, the contact list is refreshed during a predetermined time period, for example, every minute. In another embodiment, the contact list is configured to be refreshed when an event change, or other context change, is detected, for example, each time a new rule is applied, wherein the rule can include a refresh interval timer.

At least one rule is applied 306 to the contact list to determine the arrangement of the contacts in the contact list. For example, when the list is refreshed, currently-applied rules can be determined to be applicable to a current context, or determined to be inapplicable to a current context. One or more new rules can be applied to replace or complement currently-applied rules. A rule can be applied on a predetermined basis, for example, at predetermined times.

A determination can be made as to whether a change is made 308 to the contact list, for example, whether contacts are added, deleted, or whether information pertaining to a contact is changed. Contact changes can be made via a user interface corresponding to an application, for example, an e-mail application or an instant messenger application, or a user interface corresponding to a contact list.

The contact changes can include changes to contact information related to a contact. that is relevant with regard to contact ranking when the rule is executed. For example, if a rule establishes that the contact list include automobile mechanics, and a new contact is added, and the contact information indicates that the contact is a mechanic, then the contact can receive a higher ranking in the contact list than a non-mechanic. If a new contact is identified, then the contact is added 310, along with corresponding contact information 310.

Once a determination is made that no new contacts are added, then the user-defined rule in step 308 can be executed 312. Other previously-applied rules can remain in place, or be removed and replaced by the rule. The rules can be applied in a manner similar to those described herein. When the rule is executed, a search for contexts can be initiated. Alternatively, a search for contexts can be performed prior to or contemporaneously with the execution of the rule.

A context is determined 314, for example, by querying a context information source similar to those described herein. The contact list is rendered 316 in response to the executed rules and the determined contexts, for example, performed by the context list rendering module 306.

Figure 4:
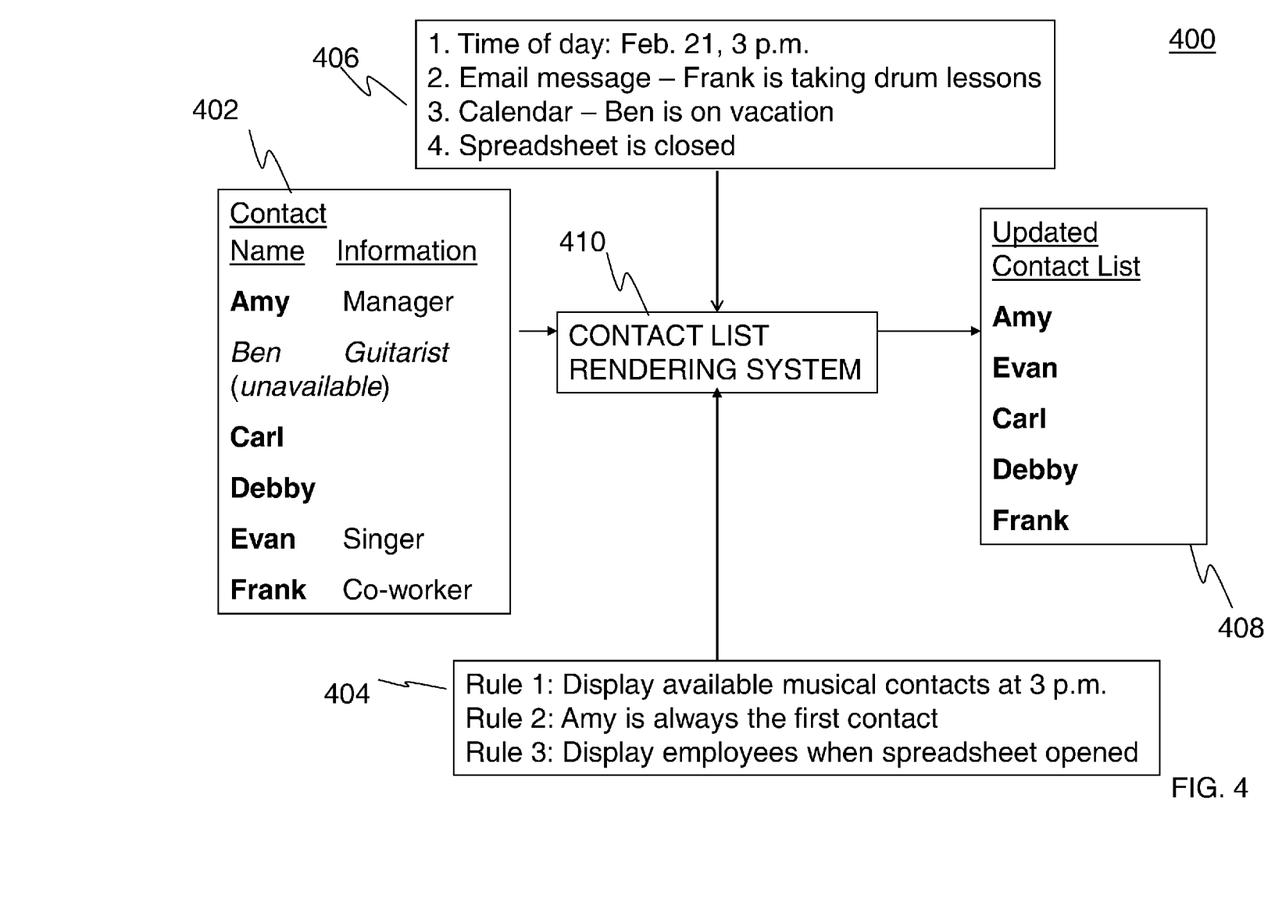
FIG. 4 is a block diagram illustrating an embodiment of the rendering of a contact list.

FIG. 4 is a block diagram illustrating an embodiment of the rendering of a contact list. During an operation, a contact list 402 is presented to a contact list rendering system 410. The contact list 402 includes six contacts: Amy, Ben, Carl, Debby, Evan, and Frank. The contact list 402 is presented in alphabetical order. The contacts in the contact list 402 can alternatively be presented in a different order, for example, a random order or in a chronological order, for example, when the contact was created, or in an order determined by the application displaying the contact list 402.

Additional contact information can be provided that corresponds to the contacts in the contact list 404. The contact information can be provided by the user when the contact is created, or as changes arise with regard to the contact, for example, the contact changes jobs or addresses. The contact information can be retrieved from an enterprise directory, for example, an LDAP server. The contact information shown in FIG. 4 indicates that Amy is the user's manager, Ben is a guitarist, Evan is a singer, and Frank is a co-worker of the user.

The contact list 402 displayed on an IM&P application. In this manner, a state of each contact can be displayed, for example, by an icon or other status indicator provided by the application user interface. In FIG. 4, Ben is displayed as unavailable indicating for example that Ben's computer is powered down, or Ben's IM&P application is inactive or closed.

Three different rules 404 are provided to the contact list rendering system 410. A first rule establishes that, at 3 p.m. the contact list is to be displayed to include contacts with a background in music. A second rule establishes that the user's manager, Amy, is to always be displayed as the first contact. A third rule establishes that the user's fellow employees are to be displayed when a spreadsheet application is executed, or opened, on the user's computer.

During operation, four different contexts are determined 406. A first context indicates that the current time is 3 p.m. A second context indicates that, according to an email message, a user contact, Frank, is taking drum lessons. A third context indicates that the user's calendar application indicates that Ben, a guitarist, is on vacation. A fourth context indicates that the user's spreadsheet is closed. Information related to the first through four contexts and/or the contact information can be retrieved by a keyword or metatag search, or by another search known to those of ordinary skill in the art. Other information can be received by the contact list rendering system 410 such as a relationship between the user and the contacts from one or more different sources, such as a social network service 12 or an LDAP directory.

The contact list rendering system generates an updated contact list 408 in response to the original contact list 402, the rules 404, and the contexts 406. In accordance with the second rule, the user's manager, Amy, is displayed as the first contact. In accordance with the second rule and the contact information, Evan is identified as a singer, and is therefore displayed at or near the top of the contact list 408. Although Ben is identified as a guitarist, Ben is not displayed on the contact list 404 in accordance with Rule 1 which requires only available musical contacts to be displayed. With regard to Rule 3, although Frank is an employee, the fourth context indicates that the user's spreadsheet is closed. Therefore, Frank remains at the bottom of the contact list 408, since no rule applies to Frank that changes Frank's position.

Accordingly, the systems and methods of the embodiments described herein permit a user to maintain a single contact list, which can dynamically change based on multiple criteria rather than switching between multiple contact lists. Also, the contents of the contact list can change in response to multiple dynamically changing criteria such as time of day, location, current task, current open web pages, calendar information, and the like.

The criteria for determining which contacts are displayed can be established by an extension mechanism that allows custom user-defined rules to be implemented which determine whether or not a contact or groups of contacts are to be displayed and the conditions under which a display decision is made. Contributions from one or more information sources to this extension mechanism can be accepted and processed to determine which contacts are displayed at any time.

Another feature is that performance of a computing system including the contact list, for example, a server, can experience performance optimization by configuring the system to monitor a subset of contacts in a user contact list instead of monitoring the entire list of contacts.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method of displaying a contact list of an application on a computing system, comprising:
   providing a contact list of an application, the contact list having a first display order;
   detecting context information related to a user of the contact list;
   applying at least one user-defined rule to the context information to determine an action to be applied to the contact list having the first display order based on the context information;
   determining whether changes are made to the contact list;
   changing the contact list by adding a new contact prior to executing the at least one user-defined rule;
   determining modifications to the first display order in accordance with requirements of the user included in the at least one user-defined rule; and
   arranging user contacts in the contact list in a second display order in response to the determined modifications to the first display order, wherein the second display order is limited to a display of a subset of contacts being fewer in number than a number of contacts in the contact list, wherein the display of the subset of fewer contacts is arranged in a different order than the first display order as determined by the at least one user-defined rule and the context information,
   wherein the application is an instant messaging application.

2. The computer-implemented method of claim 1, wherein the subset includes the added new contact.

3. The computer-implemented method of claim 1, wherein the application is an instant messaging and presence (IM&P) application and the contact list includes at least one user of the IM&P application, and wherein the contact list indicates whether the at least one user of the IM&P application is presently active on a network to which the computing system is in electrical communication.

4. The computer-implemented method of claim 1, wherein detecting the context information comprises determining a context of a user of the computing system from at least one application on the computing system.

5. The computer-implemented method of claim 4 further comprising defining by the user of the computing system the at least one rule.

6. The computer-implemented method of claim 1 further comprising providing a graphical representation of the arranged user contacts by a graphical user interface (GUI) library of the application.

7. The computer-implemented method of claim 1 further comprising applying the at least one rule to contact information related to a contact in the contact list.

8. The computer-implemented method of claim 1 further comprising detecting a change in the at least one rule, the context information, or the user contacts and, in response, arranging the user contacts in the contact list in a different display order.

9. The computer-implemented method of claim 1, wherein arranging user contacts in the contact list in the display order includes arranging the user contacts according to relevance to a user of the computing system in accordance with the at least one rule.

10. The computer-implemented method of claim 1, further comprising:
    executing the at least one rule; and
    querying a context information source for context information in response to the executed rule.

11. A computer-implemented method for displaying a contact list on a computing system, comprising:
    refreshing a contact list of an instant messaging application to arrange contacts according to a first display order;
    applying a user-defined rule to the contact list to determine an arrangement of contacts in the contact list according to relevance to the user to determine an action to be applied to the contact list having the first display order;
    adding a new contact to the contact list;
    querying the contact list to detect changes to the contact list;
    executing the user-defined rule when changes are detected to the contact list;
    determining context information related to a user of the contact list;
    determining modifications to the first display order in accordance with requirements of the user included in the user-defined rule; and
    rendering the contact list, the contacts in the contact list having a second display order arranged in response to the determined modifications to the first display order, wherein the second display order includes a display of a subset of contacts in the contact list that is arranged in a different order than the first display order as determined by the at least one user-defined rule and the context information, wherein the subset of contacts is fewer in number than a number of contacts in the contact list.

12. A computer-implemented method of claim 11, wherein the subset includes the added new contact.

13. A computer-implemented method of claim 11, wherein the application is an instant messaging and presence (IM&P) application and the contact list includes at least one user of the IM&P application, and wherein the contact list indicates whether the at least one user of the IM&P application is presently active on a network to which the computing system is in electrical communication.

14. A computer-implemented method of claim 11, wherein detecting the context information comprises determining a context of a user of the computing system from at least one application on the computing system.

15. A computer-implemented method of claim 14 further comprising defining by the user of the computing system the at least one rule.

16. A computer-implemented method of claim 11 further comprising providing a graphical representation of the arranged user contacts by a graphical user interface (GUI) library of the application.

17. A computer-implemented method of claim 11 further comprising applying the at least one rule to contact information related to a contact in the contact list.

18. A computer-implemented method of claim 11 further comprising detecting a change in the at least one rule, the context information, or the user contacts and, in response, arranging the user contacts in the contact list in a different display order than the first display order or the second display order.

19. A computer-implemented method of claim 11, wherein rendering the user contacts having the second display order includes arranging the user contacts according to relevance to the user of the computing system in accordance with the at least one rule.

20. A computer program product for displaying a contact list, the computer program product comprising:
   a non-transitory computer readable storage medium having computer readable program code embodied therewith, the computer readable program code comprising;
   computer readable program code that provides a contact list of an instant messaging application, the contact list having a first display order;
   computer readable program code that detects context information related to a user of the contact list;
   computer readable code that allows changing the contact list, wherein adding a new contact to the contact list is a change to the contact list;
   computer readable program code that determines whether changes are made to the contact list;
   computer readable program code that executes the at least one user-defined rule when the contact list is changed;
   computer readable program code that applies the at least one user-defined rule to the context information to determine an action to be applied to the contact list having the first display order based on the context information;
   computer readable program code that determines modifications to the first display order in accordance with requirements of the user included in the at least one user-defined rule; and
   computer readable program code that arranges user contacts in the contact list in a second display order according to the determined modifications to the first display order, wherein the second display order includes a display of a subset of contacts in the contact list that is arranged in a different order than the first display order as determined by the at least one user-defined rule and the context information, wherein the subset of contacts includes the added new contact and the subset is fewer in number than a number of contacts in the contact list.

* * * * *